(12) United States Patent
Xu et al.

(10) Patent No.: US 7,307,811 B2
(45) Date of Patent: Dec. 11, 2007

(54) DISC STORAGE SYSTEM DECK WITH INTEGRALLY FORMED SNUBBERS

(75) Inventors: Mo Xu, Singapore (SG); Razman Zambri, Johor Bahru (MY); KokTong Soh, Singapore (SG); WaiOnn Chee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 407 days.

(21) Appl. No.: 11/051,776

(22) Filed: Feb. 4, 2005

(65) Prior Publication Data

US 2006/0176608 A1   Aug. 10, 2006

(51) Int. Cl.
G11B 5/012   (2006.01)

(52) U.S. Cl. .................. 360/97.01; 360/97.02
(58) Field of Classification Search ... 360/97.01–97.04
See application file for complete search history.

(56) References Cited

U.S. PATENT DOCUMENTS

| | | | | |
|---|---|---|---|---|
| 4,939,611 A | * | 7/1990 | Connolly | 360/128 |
| 5,453,889 A | * | 9/1995 | Alt | 360/97.01 |
| 5,757,587 A | * | 5/1998 | Berg et al. | 360/105 |
| 5,801,899 A | * | 9/1998 | Genheimer | 360/97.01 |
| 6,055,134 A | * | 4/2000 | Boutaghou | 360/105 |
| 6,084,744 A | * | 7/2000 | Genheimer et al. | 360/97.02 |
| 6,172,843 B1 | * | 1/2001 | Genheimer et al. | 360/97.01 |
| 6,212,029 B1 | * | 4/2001 | Fioravanti | 360/97.01 |
| 6,226,144 B1 | * | 5/2001 | Nagl et al. | 360/97.01 |
| 6,226,145 B1 | * | 5/2001 | Genheimer et al. | 360/97.02 |
| 6,236,531 B1 | * | 5/2001 | Allsup et al. | 360/97.01 |
| 6,271,987 B1 | * | 8/2001 | Allsup et al. | 360/97.03 |
| 6,417,986 B1 | * | 7/2002 | Tran et al. | 360/97.02 |
| 6,424,487 B2 | * | 7/2002 | Nagl et al. | 360/97.01 |
| 6,473,270 B1 | * | 10/2002 | McDonald et al. | 360/265.1 |
| 6,477,000 B1 | * | 11/2002 | Pottebaum et al. | 360/97.02 |
| 6,535,350 B1 | * | 3/2003 | Genheimer et al. | 360/97.02 |
| 6,549,372 B1 | * | 4/2003 | Chen et al. | 360/234.5 |
| 6,704,161 B1 | * | 3/2004 | Pham et al. | 360/97.02 |
| 6,714,386 B1 | * | 3/2004 | Polycarpou et al. | 360/265.1 |
| 2005/0270691 A1 | * | 12/2005 | Pottebaum et al. | 360/97.02 |

* cited by examiner

*Primary Examiner*—A. J. Heinz
(74) *Attorney, Agent, or Firm*—Westman, Champlin & Kelly, P.A.

(57) ABSTRACT

A disc storage system component includes a deck and at least one snubber. The deck is configured for a disc to be rotatably mounted adjacent thereto. The at least one snubber is formed integrally with the deck and configured to block the disc from contacting the deck. This protects the discs from damage, either during an improper mechanical shock, or when the discs are deposited onto a mounting above a deck during assembly, in one embodiment.

20 Claims, 7 Drawing Sheets

Fig. 7

DISC STORAGE SYSTEM DECK WITH INTEGRALLY FORMED SNUBBERS

FIELD OF THE INVENTION

The present invention relates generally to the art of disc storage systems, and particularly but not by way of limitation, to protective mechanisms for the discs in a disc storage system.

BACKGROUND OF THE INVENTION

With the rapid increase in areal density of disc drives and continuing emphasis on reducing size, there is a persistent need to provide ever smaller disc storage systems. For example, one commercially available disc storage system is one inch long and five millimeters thick. A five millimeter thickness is sometimes known in the art as card type II, while a card type I is 3.3 millimeters thick. To produce a disc storage system only one inch long with the type I thickness of 3.3 millimeters has been beyond the capability in the art, due to difficulties that arise with such compact dimensions.

For example, the gap between the disc and the base deck of a disc storage system may be only 0.4 or 0.3 millimeters. If a disc storage system having a disc-deck gap in this range is dropped only around five feet, the resulting shock would likely be more than enough to deflect the outer diameter of a disc enough to strike the base deck. This interferes with the proper operation of the disc storage system, and is known as a non-operating shock. The risk of non-operating shock poses a substantial limitation to further progress in miniaturization and reliability of disc storage systems.

The shrinking of the disc-deck gap also poses an obstacle to further progress in the assembly of disc storage systems. During assembly, the disc is deposited onto the motor base assembly at a fairly high speed relative to the base deck on which the motor base assembly is disposed. The disc is intended to come to a sudden stop at rest parallel with the base deck and separated therefrom by the disc-deck gap, of perhaps 0.3 or 0.4 millimeters. Since the disc typically does not remain perfectly parallel to the base deck throughout this installation process, some portion of the outer diameter of the disc may be likely to strike the base deck before the disc becomes properly positioned on the motor base assembly. Depending on the incoming speed of the disc relative to the base deck, this may damage the disc. Trying to prevent the disc from striking the base deck and becoming damaged during installation therefore requires either a slower incoming speed for the disc relative to the base deck, which would slow down the assembly process cycle time; or greater precision in orientation of the disc relative to the base deck during the installation process, prior to the disc achieving its proper position on the motor base assembly. Either of these requirements would impose additional cost on the installation process and therefore a higher price for the disc storage system.

Past attempts to solve challenges such as these have included adding separate snubbers to a disc storage system. Traditional solutions have included, for example, a shroud mounted disc snubber, a circumferentially extending disc snubber, a snubber having a pivoting body, or a disc guard mounted to a housing adjacent to a disc.

Embodiments of the present invention provide solutions to these and other problems, and offer other advantages over the prior art.

SUMMARY OF THE INVENTION

One embodiment of the present invention pertains to a disc storage system that includes a deck configured for a disc to be rotatably mounted adjacent thereto, and at least one snubber formed integrally with the deck and configured to block the disc from contacting the deck. This protects the discs from damage, either from an improper mechanical shock during use, or when from the disc improperly striking the deck during assembly.

Another embodiment of the present invention pertains to a disc storage system that includes a base deck tray, a disc, and a base deck insert. The base deck tray includes at least one opening formed therein. The disc is rotatably mounted on a motor base assembly disposed on the deck proximate the opening or openings. The base deck insert conforms to the deck and includes at least one snubber formed integrally thereon. The snubber or snubbers are configured to extend through at least one or some of the opening or openings formed in the deck, and to block the disc from contacting the deck.

Another embodiment of the present invention pertains to a method of installing a disc in a disc storage system. The method includes the steps of providing a base deck that includes at least one snubber formed integrally thereon, and a motor base assembly disposed thereon. The method also includes depositing a disc onto the motor base assembly such that the snubber protects the disc from striking the base deck.

Other features and benefits that characterize embodiments of the present invention will be apparent to those skilled in the art from the following detailed description and the associated drawings.

DETAILED DESCRIPTION OF ILLUSTRATIVE EMBODIMENTS

Figure 1:
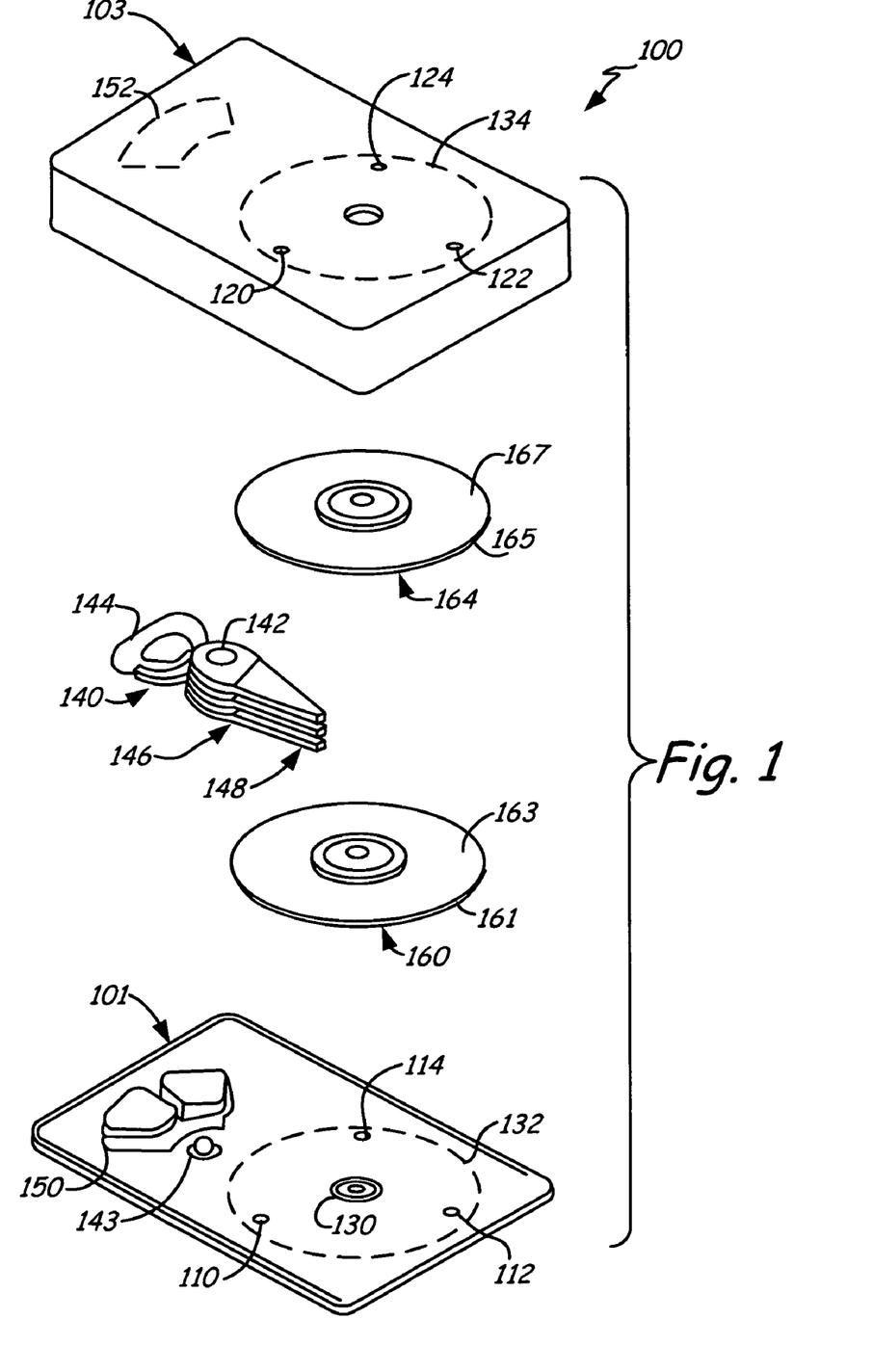
FIG. 1 depicts a exploded, oblique view of a disc storage system, according to one embodiment.

FIG. 1 depicts an exploded, oblique view of disc storage system 100, according to one embodiment of a storage system. Disc storage system 100 includes a housing formed of two decks: a base deck 101 and a top cover deck 103. Disc drive 100 also includes actuator 140 and discs 160 and 164, to be mounted on base deck 101. Base deck 101 includes snubbers 110, 112 and 114 formed integrally therewith. Also disposed on base deck 101 are motor base assembly 130, actuator boss 143, and voice coil 150. Snubbers 120, 122 and 124 are integrally formed on top cover deck 103, upon which voice coil 152 is also disposed. (Snubbers 120, 122 and 124 and voice coil 152 are depicted in dashed lines to indicate that they are disposed on the underside of top cover deck 103 as seen in the view of FIG. 1, facing toward base deck 101.)

Motor base assembly 130 of base deck 101 is configured for discs 160 and 164 to be coaxially, rotatably mounted thereon, in this embodiment. Additional discs (not depicted in FIG. 1) may also be rotatably mounted in a disc stack together with discs 160 and 164 on motor base assembly 130. Base deck 101 is therefore configured for disc 160 to be rotatably mounted adjacent to base deck 101. Base deck 101 shows disc projection 132, which is intended to be adjacent to the outer diameter of disc 160 on base deck 101, in this embodiment. Snubbers 110, 112 and 114 are integrally formed on base deck 101 just inside disc projection 132. In this way, snubbers 110, 112 and 114 are disposed adjacent to the outer diameter of disc 160. Integrally formed snubbers 110, 112 and 114 of base deck 101 are configured to block disc 160 from contacting base deck 101, either during installation of disc 160, or during subsequent operation of disc storage system 100, in this embodiment.

Disc storage system 100 also includes actuator 140, part of the system for reading data from and writing data to the surfaces of discs 160, 164, in this embodiment. Actuator 140 is rotatably mounted on actuator boss 143 of base deck 101 about actuator pivot 142, in this embodiment. Actuator 140 has voice coil 144 on one side of actuator pivot 142 about which actuator 140 is rotatable. Voice coils 150 and 152 (the latter depicted in dashed lines) are disposed on base deck 101 and top cover deck 103, respectively, and face each other, in this embodiment. When base deck 101 is attached to top cover deck 103, voice coil 144 sits between opposing voice coils 150, 152 to enable the electromagnetically induced rotational actuation of actuator 140, in this embodiment. Other types of actuators, such as linearly actuable actuators, are included in alternative embodiments. Actuator 140 has suspensions 146 on the opposing side of actuator pivot 142, including read/write heads 148 (or other elements that support a transducer such as a read/write head) at the distal end of actuator 140, suspended at the ends of suspensions 146, in this embodiment.

Discs 160, 164 are rotatably mounted on motor drive assembly 105, disposed on base deck 101, when disc drive 100 is assembled, in this embodiment. Disc 160 has opposite surfaces 161, 163, and disc 164 has opposite surfaces 165, 167. Read/write heads 148, suspended at the distal end of actuator 140, are positioned substantially adjacent to disc surfaces 161, 163, 165, 167 when the disc drive is assembled, in this embodiment. That is, each of the read/write heads 148 is suspended "above" or "below" its respective one of disc surfaces 161, 163, 165, 167, in this embodiment. Each of read/write heads 148 is capable of reading data from and writing data to the respective one of disc surfaces 161, 163, 165, 167, adjacent to which the respective one of the read/write heads 148 is suspended, in this embodiment. These read/write heads may be of any type known in the art, including magnetic, magnetoresistive, giant magnetoresistive (GMR), optical, etc. in various embodiments. In alternative embodiments, a wide variety of numbers of discs, with a corresponding number of read/write heads and transducers, may be used.

The center of disc 160 on motor base assembly 130 lies within a triangle defined by the three snubbers 110, 112 and 114 as its three points, in this embodiment. In this way, whichever way disc 160 is tilted during installation, a shock event, or otherwise, disc 160 would be blocked from contacting base deck 101 by at least one of snubbers 110, 112 or 114, after disc 160 undergoes only a minimal angle of tilt, in this embodiment. Snubbers 110, 112 and 114 are thereby configured to block disc 160 from contacting base deck 101.

In an alternative embodiment, the floor of base deck 101 is also not level about disc projection 132, in which case at least one snubber is disposed at a location where the spacing between base deck 101 and disc 160 is the minimum. This is another example of how at least one of snubbers 110, 112 and 114 is configured to block disc 160 from contacting base deck 101, in this embodiment.

Any number of snubbers may be used in different embodiments, including embodiments with one snubber, embodiments with two snubbers, and embodiments with at least three snubbers. In some embodiments, more than three snubbers are integrally formed on base deck 101, including four, five, or more snubbers. In certain of these embodiments, the snubbers are arranged so that the center of disc 160 is disposed inside a polygon formed by the several snubbers, so that the disc is likely to be protected no matter which direction the disc is tilted. In other embodiments, as few as two or one snubbers may be integrally formed on one deck. In embodiments comprising two opposing decks forming a housing around both ends of a disc stack, either one or the other deck or both decks may comprise one snubber or a number of snubbers integrally formed with the deck. For example, in alternative embodiments analogous to that of FIG. 1, snubbers may be integrally formed with only base deck 101, or only with top cover deck 103.

In illustrative embodiments, for example, only two snubbers, or only one snubber, may be integrally formed on a base deck otherwise analogous with base deck 101. For example, these integrally formed snubbers may be used in combination with some other mechanism for protecting disc 160, such as distinctly formed snubbers that are not integrally formed with base deck 101, but instead are disposed in separate components mounted onto base deck 101 or integrated with actuator 140, for example. These distinctly formed snubbers may be used in combination with any number of integrally formed snubbers included on base deck 101, whether one, two, three, or more integrally formed snubbers.

In the embodiment of FIG. 1, snubbers 110, 112 and 114 are formed integrally with base deck 101, rather than being formed separately from base deck 101 and then mounted onto base deck 101. In other words, snubbers 110, 112 and 114 are integrally formed with base deck 101 in that snubbers 110, 112 and 114 are formed of the same material as at least a substantial portion of base deck 101 including the portions where snubbers 110, 112 and 114 are disposed, and snubbers 110, 112 and 114 are made at the same time as base deck 101, as simply part of base deck 101.

For example, in one illustrative embodiment, a substantial part of base deck 101 is molded from a moldable substance such as plastic or rubber of any of various types, forming an overmolded deck insert bonded to a deck tray to form base deck 101; and snubbers 110, 112 and 114 are part of the shape that the plastic or rubber deck insert is molded into, such as by extrusion molding. Any other materials may be used in other embodiments. As one particular example, the substantial part of base deck 101 incorporating snubbers 110, 112 and 114 is composed of a thermoset molding plastic based on an unsaturated polyester resin that contains inorganic fillers such as calcium carbonate, aluminum trihydrate, chopped fiberglass, carbon fibers or carbon nanotubes, in various embodiments. Creating snubbers by including them in the integral formation of a deck provides the advantages of not requiring the separate manufacture of distinct snubbers and the separate manufacturing step of mounting such distinct snubbers onto a distinct deck, among other substantial advantages. For example, it has been found that a base deck may be manufactured with integrally formed snubbers for no measurable cost above that of manufacturing a similar base deck without integrally formed snubbers. This represents one substantial distinction of illustrative embodiments over prior art devices in which a separately manufactured snubber component had to be mounted into the device.

As another example, in alternative embodiments, a substantial part of base deck 101 is formed of a relatively rigid material such as steel, aluminum, some other metal, carbon fiber, ceramic, or a similar material, and snubbers 110, 112 and 114 are formed integrally as part of the same rigid material, with a formed-in-place gasket or a pad added thereto. In some embodiments, adding a pad or formed-in-place gasket to an integrally formed snubber may provide greater protection than an integrally formed snubber alone, yet with greater simplicity and less expense than manufacturing and mounting distinct snubbers. Such a pad is composed of a padding material that provides a softer, more yielding contact surface, i.e. the surface of one of snubbers 110, 112 and 114 that contacts disc 160, in this embodiment. This padding material may include a composition of plastic, rubber, formed-in-place gasket, or some other similar material, or a combination thereof, in these embodiments. Such a pad has a relatively low Young's modulus, thus providing a lowering of the overall Young's modulus of the respective snubber among snubbers 110, 112 and 114, allowing an elastic collision of disc 160 against the contact surface of the respective snubber to compress the respective snubber over a greater distance. This in turn increases the length of time over which the collision contact takes place, and dramatically reduces the acceleration exerted against disc 160 by a collision.

Snubbers 110, 112 and 114 are configured to block disc 160 from contacting base deck 101 upon which snubbers 110, 112 and 114 are integrally formed, offering advantageous protection for disc storage system 100. For example, the gap between base deck 101 and disc 160 of disc storage system 100 may be in the range of 0.3 to 0.4 millimeters, in one illustrative embodiment. If disc storage system 100 of this embodiment is dropped only around five feet onto a typical floor or table surface, the resulting collision may subject disc storage system 100 to a shock of around 1500 to 2000 g's of acceleration or more, depending on the type of surface impacted; while tests show that in a similar disc storage system but without snubbers, 1500 g's of shock are more than enough to deflect the outer diameter of a disc more than 0.4 millimeters and strike the base deck, disrupting the operation of the disc storage system and likely damaging the disc. (One g is understood to be the average gravitational acceleration of the Earth at its surface, i.e. approximately 9.8 meters per second squared.) On the other hand, if disc storage system 100 is shocked, disc 160 contacts one of snubbers 110, 112 or 114 before it has a chance to strike base deck 101. At least one of snubbers 110, 112 and 114 provides a yielding and elastic contact against disc 160, rendering an acceleration on disc 160 that is a fraction of the shock acceleration on disc storage system 100, in the event of an impact. For example, base deck 101 may be composed of a hard metal such as steel or aluminum, whilesnubbers 110, 112 and 114 comprise a soft and yielding material, such as rubber, plastic, or formed-in-place gasket, for example.

Top cover deck 103 includes snubbers 120, 122 and 124 and voice coil 152 (depicted in dashed lines) disposed on the underside thereof, facing in the direction of base deck 101, in the embodiment of FIG. 1. Snubbers 120, 122 and 124 are integrally formed with top cover deck 103, similarly to how snubbers 110, 112 and 114 are integrally formed with base deck 101, in this embodiment. Snubbers 120, 122 and 124 are disposed just inside disc projection 134 on top cover deck 103, which marks the projection of the outer diameter of disc 164, or the top disc of a disc stack when additional discs are used, when disc drive 100 is assembled. Snubbers 120, 122 and 124 are configured to block disc 164, when disc 164 is rotatably mounted at the top of a disc stack on base deck 101 adjacent to top cover deck 103, from contacting top cover deck 103, either during assembly or subsequent operation of disc drive 100, in this embodiment.

While the embodiment of FIG. 1 is directed to a disc drive, a variety of other applications incorporating the present invention may also occur in alternative embodiments, including those involving hard disc drives, floppy discs drives, arrays of disc drives, networked disc drives, optical disc players, or other devices and systems including discs, the performance of which may benefit from the protection of integrally molded snubbers.

Figure 2:
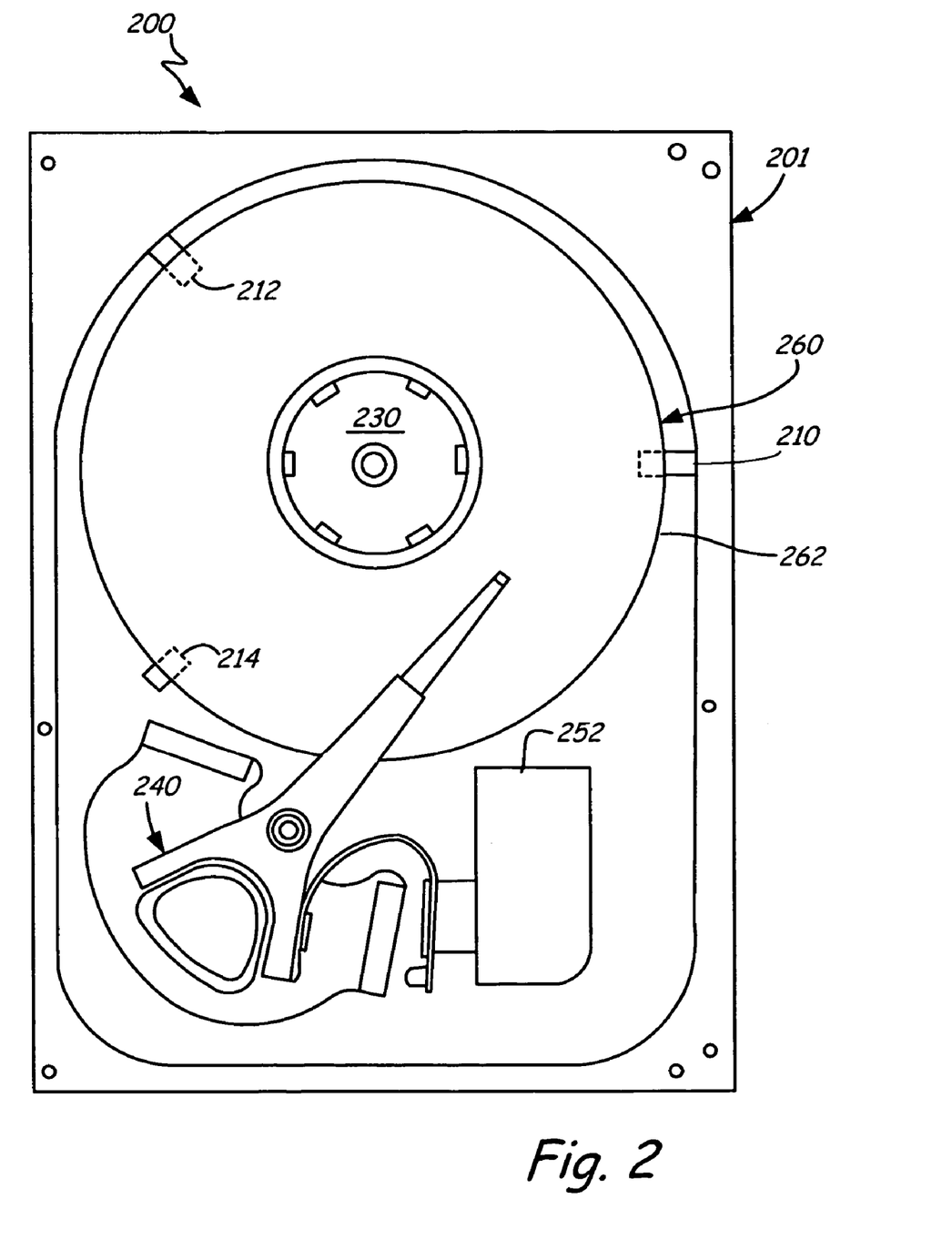
FIG. 2 depicts a top view of a disc storage system, according to one embodiment.

FIG. 2 illustrates a top view of disc storage system 200, according to one embodiment. Disc storage system 200 includes base deck 201; motor base assembly 230 disposed on base deck 201; and disc 260 rotatably mounted on motor base assembly 230. Disc 260 is thereby rotatably mounted adjacent to base deck 201. Disc 260 may be disposed in disc storage system 200 alone, or as one of several discs in a disc pack (not depicted in FIG. 2), in different embodiments. Actuator 240 and module 252 are also disposed on base deck 201. Snubbers 210, 212 and 214 are integrally formed with base deck 201, and are depicted in dashed lines, where they extend axially below disc 260. That is, at least part of each of snubbers 210, 212 and 214 is axially opposed by disc 260, or opposed along an axial direction, i.e. substantially parallel to the axis of rotation of disc 260, "in and out" of the page as seen in FIG. 2. Snubbers 210, 212 and 214 are integrally formed with base deck 201 axially opposing outer diameter 262, in this embodiment. Snubbers 210, 212 and 214 are thereby configured to block disc 260 from contacting base deck 201, with a minimal angle of deflection of disc 260.

Figure 3:
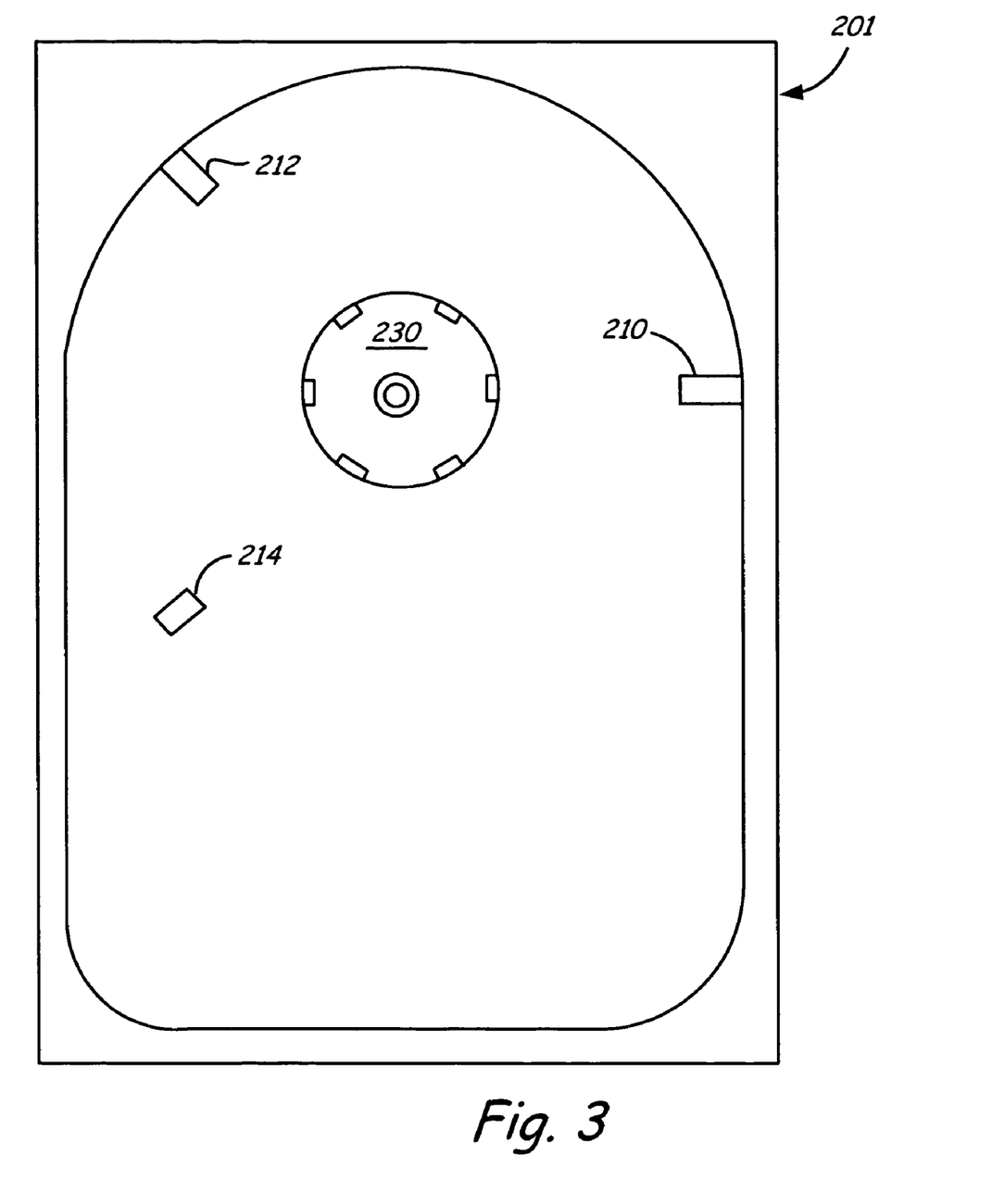
FIG. 3 depicts a top view of a disc storage system component, according to one embodiment.

FIG. 3 illustrates a top view of disc drive base deck 201, as a storage system component according to the embodiment of FIG. 2. Base deck 201 includes integrally formed snubbers 210, 212 and 214. Motor base assembly 230 is also disposed on base deck 201, contributing to base deck 201 being configured for a disc to be rotatably mounted adjacent thereto. Motor base assembly 230 is disposed concentrically to the positions of integrally formed snubbers 210, 212 and 214, thereby also contributing to snubbers 210, 212 and 214 being configured to block a disc mounted on motor base assembly 230 from contacting base deck 201. This assumes the disc is of proportionate size compared to base deck 201, such that the outer diameter of the disc lies axially opposite at least one of snubbers 210, 212 and 214.

Figure 4:
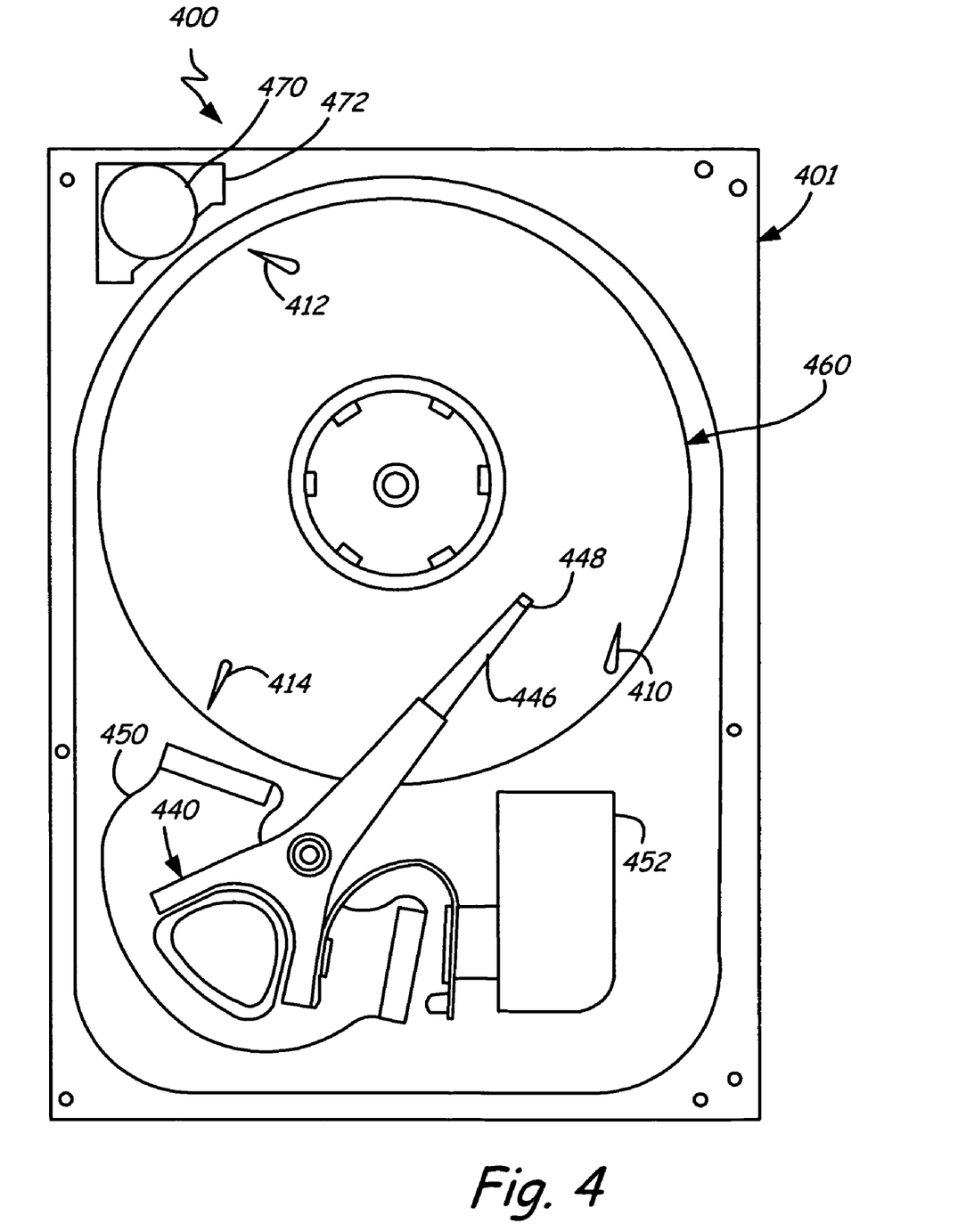
FIG. 4 depicts a top view of a disc storage system, according to one embodiment.

FIG. 4 depicts a disc storage system 400, according to one embodiment that shares some characteristics with disc storage system 200 of FIG. 2. Disc storage system 400 includes base deck 401, with streamlined snubbers 410, 412 and 414 integrally formed with base deck 401. Disc storage system 400 also includes disc 460 and several additional components disposed on base deck 401 similar to comparable features of the disc storage systems described above.

Snubbers 410, 412 and 414 protect disc 460 from impacting base deck 401, and are also streamlined, in this embodiment. As disc 460 rotates, in a counterclockwise direction in this embodiment, its friction with the surrounding fluid induces a flow in the fluid in the same counterclockwise direction, in the vicinity of disc 460. Streamlined snubbers 410, 412 and 414 are shaped to offer reduced resistance to that flow, and to encourage the flow to remain laminar as it passes by each of snubbers 410, 412 and 414, in this embodiment.

Snubbers 410, 412 and 414 are also shaped to direct the flow along desirable paths, in this embodiment. For example, snubber 412 is shaped to direct the flow within disc storage system 400 toward recirculation filter 470, disposed on recirculation filter holder 472; snubber 414 is shaped to direct the flow within disc storage system 400 upstream of suspension 446 away from disc 460 and suspension 446, and around magnet 450 and actuator 440 instead; and snubber 410 is shaped to direct a flow from the vicinity of suspension 446 or module 452, downstream of suspension 446, away from suspension 446 and instead further along disc 460. Directing flow toward recirculation filter 470, as done by snubber 412, will assist in the efficiency with which recirculation filter 470 is able to filter dust and particulate matter out of the fluid within disc storage system 400. Directing flow away from suspension 446 of actuator 440 will assist in limiting mechanical excitation of suspension 446, which limits the positioning precision and therefore the performance of read/write head 448 suspended at the end of suspension 446, in this embodiment.

The competing design objectives of snubbers 410, 412 and 414 to be streamlined or to deflect a flow along a desired path may be given different priority in various embodiments, with perhaps only one or the other, or neither, of these two capabilities in any one embodiment. In embodiments in which both of these characteristics are designed for, snubbers 410, 412 and 414 are shaped to optimize a compromise between the two capabilities, in analogy to an airfoil being optimized for a compromise between being streamlined and providing a lifting force.

Figure 5:
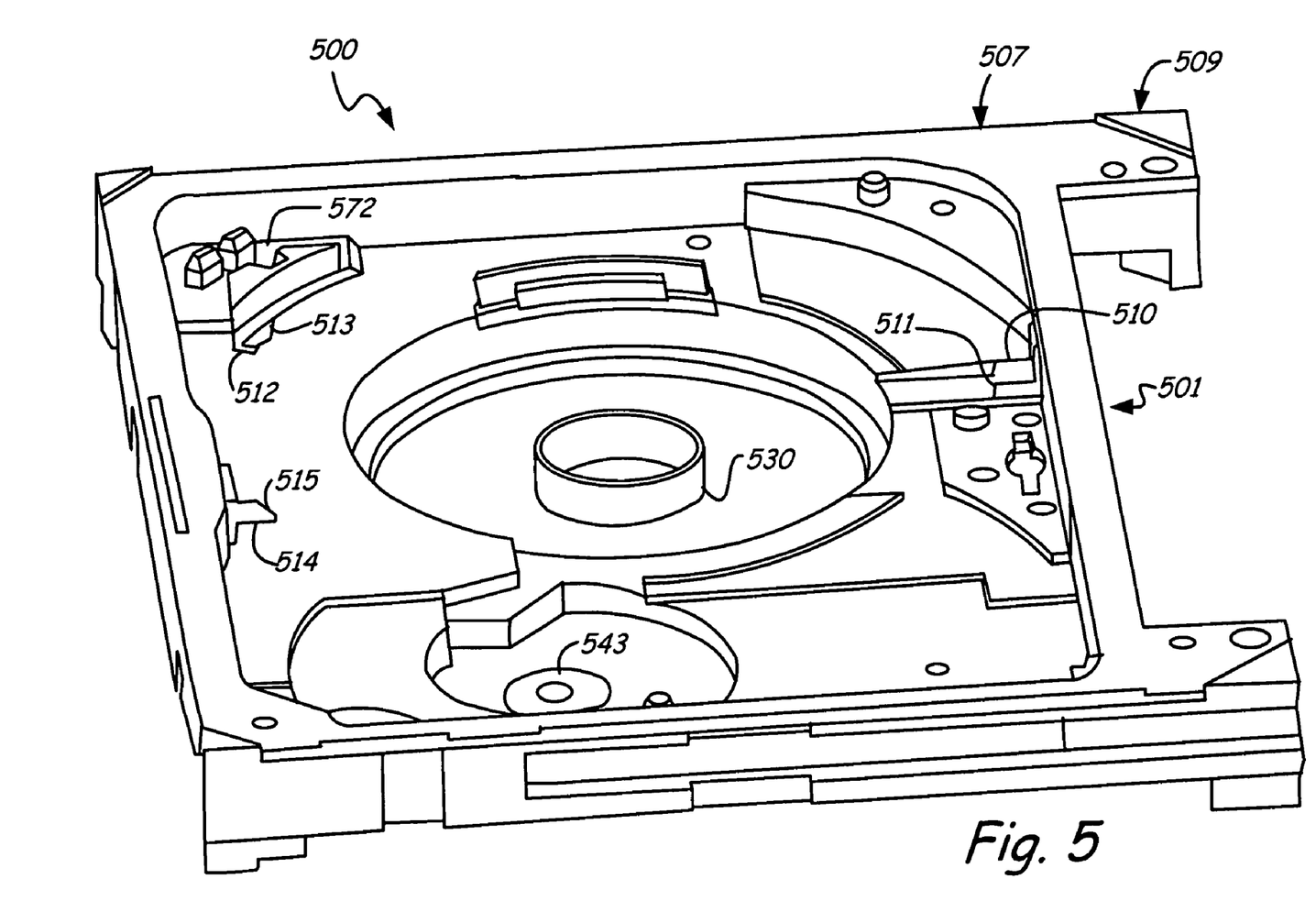
FIG. 5 depicts an oblique view of a disc storage system component, according to one embodiment.

FIG. 5 depicts an oblique view of disc storage system component 500, comprising base deck 501, according to one embodiment. Base deck 501 comprises two main elements: base deck tray 507, and base deck insert 509, moldably conforming and adhering to base deck tray 507, in this embodiment. Base deck tray 507 is composed of a rigid metal such as steel or aluminum, for example, in this embodiment. Base deck insert 509 is composed of a yielding plastic in this embodiment, such as a thermoset molding plastic based on unsaturated polyester resin that contains inorganic fillers such as calcium carbonate, aluminum trihydrate, chopped fiberglass, carbon fibers or carbon nanotubes, or combinations thereof, in various embodiments.

Base deck insert 509 of base deck 501 comprises snubbers 510, 512 and 514, in this embodiment. Base deck tray 507 includes snubber holes 511, 513 and 515, through which snubbers 510, 512 and 514 conformingly protrude, respectively, in this embodiment. Snubbers 510, 512 and 514 are thereby formed integrally with base deck 501, by being formed integrally with base deck insert 509 of base deck 501, and are well configured to block a disc from contacting base deck tray 507 of base deck 501, in this embodiment. This configuration combines the soft, cushioning plastic, for example, of snubbers 510, 512 and 514, with the structural rigidity and strength of base deck tray 507, in a single base deck 501, with snubbers 510, 512 and 514 integrally formed on base deck insert 509 of base deck 501. The integral formation of snubbers 510, 512 and 514 in base deck insert 509 also means this configuration is accomplished with no need to craft and then mount separate snubber components onto a base deck, and no significant cost beyond manufacturing base deck 501 in the first place, composed of base deck tray 507 with base deck insert 509 molded adheringly thereto.

Base deck tray 507 comprises motor base assembly 530, as part of how base deck 501 is configured for a disc to be rotatably mounted adjacent thereto. Base deck tray 507 also comprises actuator boss 543, configured such that an actuator may be mounted thereon. Base deck 501 also comprises recirculation filter holder 572, upon which a recirculation filter might be mounted. Snubbers 510 and 512 are integrally formed on base deck 501 adjacent to side walls thereof, while snubber 514 is integrally formed on base deck 501 adjacent to recirculation filter holder 572.

Figure 6:
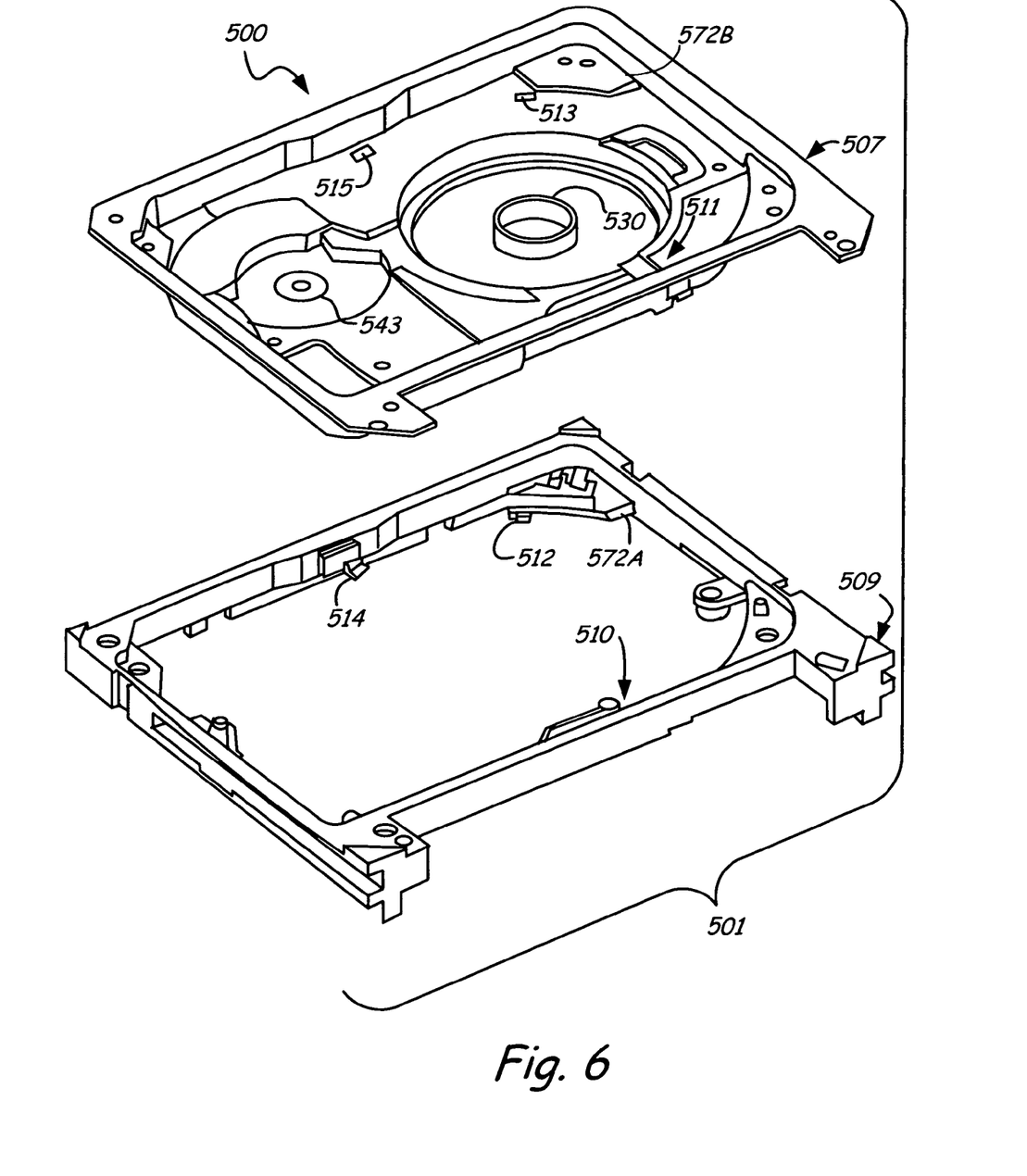
FIG. 6 depicts a exploded, oblique view of a disc storage system component, according to one embodiment.

FIG. 6 depicts an exploded, oblique view of base deck 500 including base deck tray 507 and base deck frame 509, conforming to the embodiment of FIG. 5. All the components of base deck 501 numbered and described in reference to FIG. 5 also appear in FIG. 6, in a view that clarifies the separate structures of base deck tray 507 and base deck insert 509, before base deck insert 509 is molded onto base deck 507 to form the integral whole of base deck 501.

For example, base deck insert 509 includes snubbers 510, 512 and 514, as well as a portion of recirculation filter holder 572, here labeled 572A. Base deck tray 507, meanwhile, comprises snubber holes 511, 513 and 515, motor base assembly 530, actuator boss 543, and the remaining portion of recirculation filter holder 572, here labeled 572B.

Figure 7:
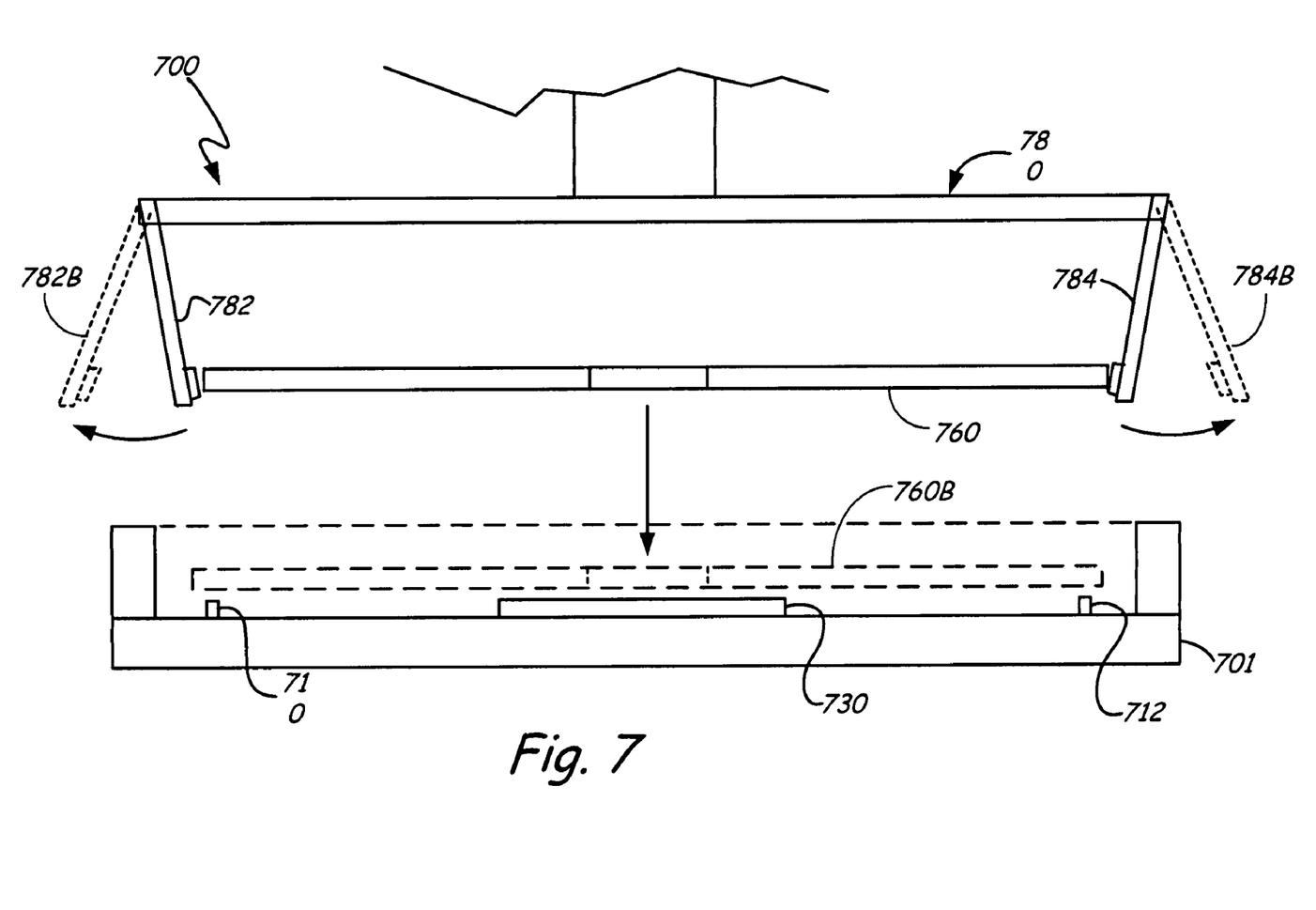
FIG. 7 depicts a forward view of a disc being deposited into a disc storage system, according to a method of one embodiment.

FIG. 7 depicts a forward view of a disc 760 being placed into a disc storage system 700 during assembly of disc storage system 700, according to a method of one embodiment. FIG. 7 is intended to convey the passage of time as disc 760 is deposited into place within disc storage system 700. Disc 760 is originally gripped by pincers 782, 784 of disc gripper 780. Then, disc gripper 780 releases its hold on disc 760 by swinging pincers 782, 784 to their new positions, at 782B, 784B (depicted in dashed lines). This release by disc gripper 780 is likely to coincide with significant downward motion of disc gripper 780, relative to disc storage system 700, toward disc storage system 700. Disc 760 is then deposited from its earlier position between pincers 782, 784 of disc gripper 780, to the new disc position indicated as 760B (depicted in dashed lines) within disc storage system 700. In particular, disc 760 has been mounted onto motor base assembly 730, and disc 760 is rotatably mounted adjacent to base deck 701 of disc storage system 700.

Disc 760 may often be deposited with such speed or force that it would otherwise be in danger of being damaged by striking at least part of its periphery against base deck 701. However, snubbers 710, 712 are integrally formed with base deck 701, in this embodiment. Snubbers 710, 712 are axially opposed by disc 760, in particular, by the outer diameter (not separately labeled) of disc 760. Snubbers 710, 712 are thereby configured to block disc 760 from contacting base deck 701, a contact which might otherwise damage disc 760.

The present invention therefore includes unexpected and novel advantages as detailed herein and as can be further appreciated from the claims, figures, and description by those skilled in the art. Although particular embodiments such as this are described in reference to a disc drive, the present invention has various other embodiments with application to other disc storage systems. It will be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and various combinations of various features depicted and described in various embodiments, within the principles of the present invention, to the full extent indicated by the broad general meaning of the terms in which the appended claims are expressed.

For example, the particular elements may vary depending on the particular application in which the device is used while maintaining substantially the same functionality without departing from the scope and spirit of the present invention. In addition, although some of the embodiments described herein are directed to a data storage device, such as a multiple disc system, it will be appreciated by those skilled in the art that the teachings of the present invention can be applied to a single disc system or any other data storage or non-data storage application where the device is useful, without departing from the scope and spirit of the present invention.

What is claimed is:

1. A disc storage system component comprising:
    a deck configured for a disc to be rotatably mounted adjacent thereto, wherein the deck comprises a deck tray, and a deck insert that is formed conformingly with the deck tray; and
    at least one snubber, formed integrally with the deck insert, and configured to block the disc from contacting the deck.

2. The disc storage system component of claim 1, further comprising a disc mounted rotatably on a motor base assembly disposed on the deck.

3. The disc storage system component of claim 2, wherein the disc axially opposes the at least one snubber.

4. The disc storage system component of claim 2, wherein the disc comprises an outer diameter, and the at least one snubber is integrally formed on the deck axially opposite to the outer diameter.

5. The disc storage system component of claim 1, wherein the deck is a base deck.

6. The disc storage system component of claim 1, wherein the deck is a top cover deck.

7. The disc storage system component of claim 1, wherein the deck comprises a recirculation filter holder, and the at least one snubber is formed integrally with the recirculation filter holder.

8. The disc storage system component of claim 1, wherein the at least one snubber comprises rubber.

9. The disc storage system component of claim 1, wherein the at least one snubber comprises plastic.

10. The disc storage system component of claim 1, further comprising a formed-in-place gasket disposed on a contact surface of the at least one snubber.

11. The disc storage system component of claim 1, further comprising a pad disposed on a contact surface of the at least one snubber, that reduces a Young's modulus of the at least one snubber.

12. The disc storage system component of claim 1, wherein the at least one snubber is shaped to direct a flow within the disc storage system toward a recirculation filter.

13. The disc storage system component of claim 1, wherein the at least one snubber is shaped to direct a flow within the disc storage system away from a suspension of an actuator rotatably mounted on the deck.

14. The disc storage system component of claim 1, further comprising a snubber disposed on a separate component mounted onto the deck.

15. The disc storage system component of claim 14, further comprising an actuator, and a snubber formed integrally with the actuator.

16. The disc storage system component of claim 1, wherein the deck insert is formed of a softer material than the deck tray.

17. The disc storage system component of claim 1, wherein the deck tray comprises one or more snubber holes, and the at least one snubber is disposed though the one or more snubber holes.

18. A disc storage system comprising:
    a deck tray comprising at least one opening formed therein;
    a disc, rotatably mounted adjacent the deck tray proximate the at least one opening; and
    a deck insert, conforming to the deck tray and comprising at least one snubber formed integrally thereon, the at least one snubber configured to extend though the at least one opening formed in the deck tray, and to block the disc from contacting the deck tray.

19. The disc storage system of claim 18, further comprising at least one additional opening formed in the deck tray, and at least one additional snubber formed integrally in the deck insert, configured to extend though the at least one additional opening formed in the deck tray, and to block the disc from contacting the deck tray.

20. A disc storage system component comprising:
    a deck configured for a disc to be rotatably mounted adjacent thereto; and
    a means for blocking the disc from contacting the deck, wherein the means is formed integrally with the deck.

* * * * *

UNITED STATES PATENT AND TRADEMARK OFFICE
CERTIFICATE OF CORRECTION

PATENT NO. : 7,307,811 B2
APPLICATION NO. : 11/051776
DATED : December 11, 2007
INVENTOR(S) : Xu et al.

Page 1 of 1

It is certified that error appears in the above-identified patent and that said Letters Patent is hereby corrected as shown below:

Col. 9, line 23, delete "tray, and a deck insert that is formed conformingly with the deck tray," and insert -- to support the rotatably mounted disk, and a deck insert that is formed conformingly with and for supporting the deck tray --.

Col. 10, line 35, delete "though" and insert -- through --.

Signed and Sealed this

Third Day of June, 2008

JON W. DUDAS
*Director of the United States Patent and Trademark Office*